US008285850B1

(12) United States Patent
Jones et al.

(10) Patent No.: US 8,285,850 B1
(45) Date of Patent: Oct. 9, 2012

(54) CONFIGURATION AND DYNAMIC DETECTION OF CONNECTION-BASED BACKUP POLICIES

(75) Inventors: Nathan Jones, Arroyo Grande, CA (US); Bryan Archambeault, Nipomo, CA (US); Ernie Billing, San Luis Obispo, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1151 days.

(21) Appl. No.: 11/334,828

(22) Filed: Jan. 19, 2006

(51) Int. Cl.
*G06F 15/16* (2006.01)
(52) U.S. Cl. ........................ 709/227; 709/249
(58) Field of Classification Search .................. 709/227, 709/249
See application file for complete search history.

(56) References Cited

U.S. PATENT DOCUMENTS

| | | | |
|---|---|---|---|
| 5,870,561 A * | 2/1999 | Jarvis et al. | 709/238 |
| 6,038,379 A | 3/2000 | Fletcher et al. | |
| 6,771,661 B1 * | 8/2004 | Chawla et al. | 370/468 |
| 6,954,660 B2 | 10/2005 | Aoyama | |
| 6,975,854 B1 | 12/2005 | Kee | |
| 7,039,830 B2 | 5/2006 | Qin | |
| 7,043,507 B2 | 5/2006 | Lanzatella et al. | |
| 7,139,846 B1 * | 11/2006 | Rossi | 710/6 |
| 7,668,966 B2 * | 2/2010 | Klinker et al. | 709/232 |
| 2002/0038296 A1 * | 3/2002 | Margolus et al. | 707/1 |
| 2004/0098383 A1 * | 5/2004 | Tabellion et al. | 707/3 |
| 2004/0199566 A1 * | 10/2004 | Carlson et al. | 709/201 |
| 2005/0060281 A1 * | 3/2005 | Bucher et al. | 707/1 |
| 2005/0262168 A1 * | 11/2005 | Helliker et al. | 707/204 |
| 2006/0041726 A1 * | 2/2006 | Steubing | 711/162 |
| 2006/0075467 A1 * | 4/2006 | Sanda et al. | 726/1 |
| 2007/0005808 A1 * | 1/2007 | Day | 709/248 |

* cited by examiner

*Primary Examiner* — Haresh N Patel
*Assistant Examiner* — Lawrence Cosby
(74) *Attorney, Agent, or Firm* — Rory D. Rankin; Meyertons, Hood, Kivlin, Kowert & Goetzel, P.C.

(57) ABSTRACT

A system and method for managing data transfers between client computers and a computer network. Each client comprises a data transfer controller and at least two data transfer rules. The data transfer controller associates each of at least two connection states with one of the data transfer rules. The data transfer controller also detects a connection state of a client device, applies a first data transfer rule to the client device in response to detecting a first connection state, and applies a second data transfer rule to the client device in response to detecting a second connection state. In a further embodiment, the data transfer controller associates a data transfer policy with attributes of a connection between the client device and the computer network, wherein a connection state comprises a set of values of the attributes of the connection.

19 Claims, 6 Drawing Sheets

CONFIGURATION AND DYNAMIC DETECTION OF CONNECTION-BASED BACKUP POLICIES

BACKGROUND OF THE INVENTION

1. Field of the Invention

This invention relates to computer networks and, more particularly, to protecting data within computer networks.

2. Description of the Related Art

In the enterprise computing environment, it has become common for client computers to be dynamically connected to the enterprise network through a variety of connection types. Furthermore, the increasing use of mobile devices such as laptop computers has meant that the method of connection to the enterprise network may change frequently as the mobile user travels from place to place. For example, each mobile computer may connect to a network via modem, wireless local area network (LAN), direct wired LAN, wireless connection through a wide area network (WAN) or direct cable through a WAN, among other methods dependent upon the available connection options at any particular location. While it is generally useful to be able to use a variety of connection types, the capabilities of each connection vary from one type to another. For example, modem connections are generally slower than wireless connections, which may be slower than directly cabled connections. In addition, direct LAN connections may be faster than connections that require data to be transferred across a WAN.

Because of the differing capabilities of various connection types, it is generally desirable for software applications to be able to determine if and when a network connection changes. There are a variety of ways to determine the characteristics of a network connection. For example, Microsoft's Windows® operating system provides some standard network API calls to the application programmer. In particular, a call to RasConnectionNotification( ) notifies the caller when the remote access service (RAS) connection state changes. Also, a call to NotifyAddrChange( ) notifies the caller when the IP address changes for any reason, such as disabling of the network interface card, unplugging a cable, establishment of a dial-up connection, etc. In addition, an application may request information about a connection by calling InternetGetConnectedState( ) which returns the current connection type (modem, LAN, not connected, etc.) Other operating systems may provide similar capabilities.

In addition to the above considerations, it is generally desirable for enterprises to protect the data that resides on mobile computing devices via some type of backup mechanism. However, changes to the connection type by mobile users tend to complicate any backup mechanism. For instance, a backup mechanism may attempt to backup data from a mobile computer each time it is connected to the enterprise network, regardless of connection type. However, if the connection type is slow, such as via a modem, a user who is attempting to access e-mail or browse the internet may be frustrated as the available bandwidth is consumed by backup data transfers. Depending on a number of factors, it may not be necessary to require the same backup policy for every user regardless of connection type. For example, an enterprise data protection strategy may prefer to adjust the frequency of data backups according to the identity of the user, the type of connection, and/or the bandwidth of the connection. In addition, it may be desirable to determine whether to backup individual files based on the combination of file size and connection type. Therefore, backup policies that account for these issues are desired.

SUMMARY OF THE INVENTION

Various embodiments of a system and method for managing data transfers between client devices and a computer network are disclosed. In one embodiment, a computer system including a plurality of client devices is connected to a network, each client comprising a data transfer controller and at least two data transfer rules. The data transfer controller associates each of at least two connection states with one of the data transfer rules. The data transfer controller also detects a connection state of a client device, applies a first data transfer rule to the client device in response to detecting a first connection state, and applies a second data transfer rule to the client device in response to detecting a second connection state.

In a further embodiment, the data transfer controller associates a data transfer policy with one or more attributes of a connection between the client device and the computer network, wherein a connection state comprises a set of values of the one or more attributes. The data transfer controller is further configured to detect a first connection state of a client device and apply a first data transfer rule that is associated with the first connection state to the client device. The data transfer controller is still further configured to detect a change in the connection state of the client device to a second connection state and apply a second data transfer rule that is associated with the second connection state to the client device.

In a still further embodiment, a data transfer controller on each of a plurality of client devices is further configured to associate a data transfer policy with one or more attributes of a connection between the client device and the computer network, wherein a connection state comprises a set of values of the one or more attributes. A data transfer controller of a first client device is configured to detect a first connection state of the first client device and apply a first data transfer rule to the first client device. A data transfer controller of a second client device is configured to detect a second connection state of the second client device and apply a second data transfer rule to the second client device.

These and other embodiments will become apparent upon reference to the following description and accompanying figures.

Figure 1:
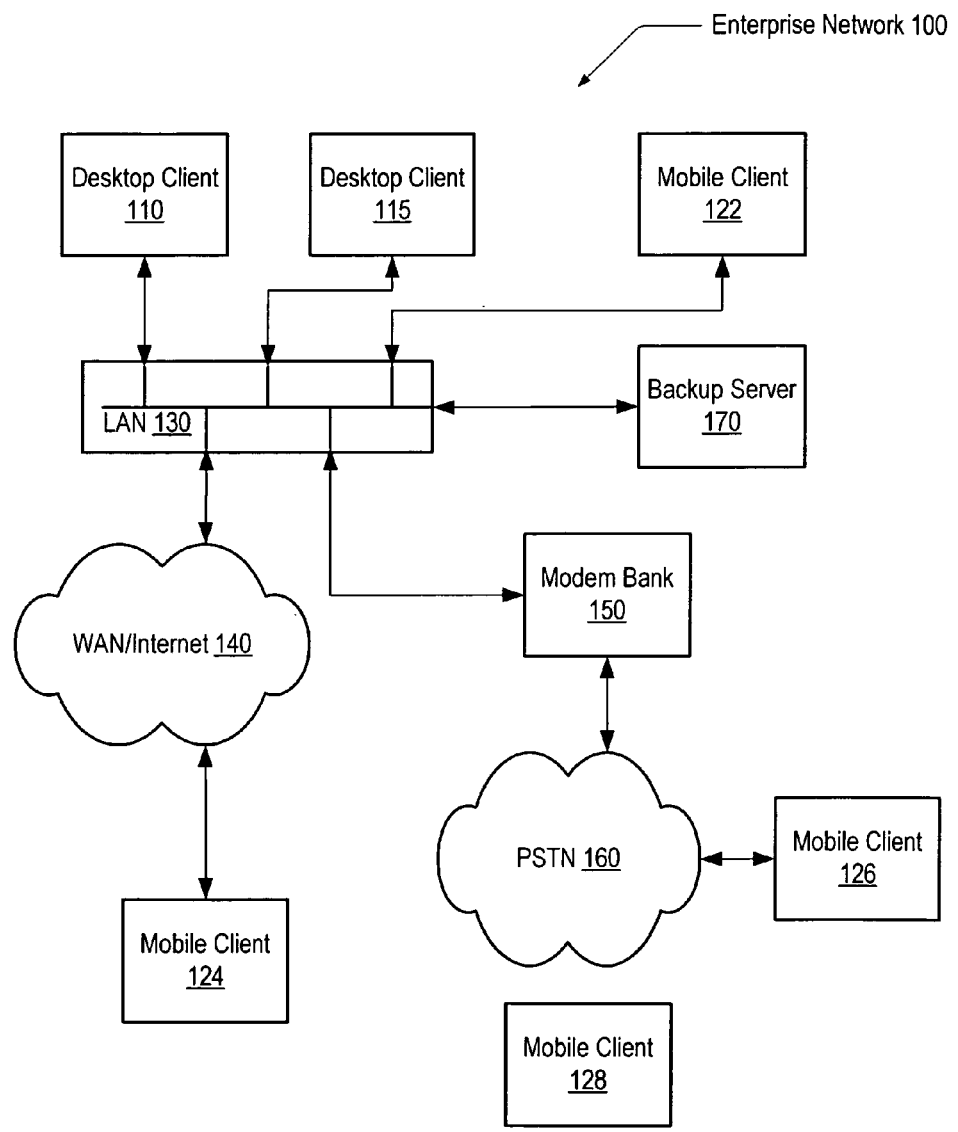
FIG. 1 illustrates one embodiment of an enterprise network.

The following description is presented to enable one of ordinary skill in the art to make and use the invention. While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates one embodiment of an enterprise network 100. Enterprise network 100 may includes desktop clients 110 and 115 which are representative of any number of stationary client computers. Enterprise network 100 may also include mobile clients 122, 124, 126, and 128 which are representative of any number of mobile client computing devices such as laptops, handheld computers, etc. In one embodiment, enterprise network 100 includes a local area network (LAN) 130 to which are connected a modem bank 150 and a backup server 170. LAN 130 may also be connected to a wide area network (WAN)/internet 140 and or to the public switched telephone network (PSTN) 160 via modem bank 150. In the illustrated embodiment, mobile client 122 is directly connected to LAN 130, mobile client 124 is connected to LAN 130 via WAN 140, mobile client 126 is connected to LAN 130 via PSTN 160 and modem bank 150, and mobile client 128 is not connected to LAN 130, i.e., it is offline.

In alternative embodiments, the number and type of clients is not limited to desktop clients 110 and 115 and mobile clients 122, 124, 126, and 128. Almost any number and combination of desktop and mobile clients may be connected to enterprise network 100 via various combinations of modem banks, direct LAN connections, wireless connections, WAN links, etc. Also, at various times one or more clients may operate offline. In addition, during operation, individual client connection types may change as mobile users travel from place to place connecting, disconnecting, and reconnecting to enterprise network 100.

Within enterprise network 100, it may be desired to protect data associated with any of clients 122, 124, 126, and 128. In order to protect client data, various backup operations are possible. For example, in one embodiment, backup server 170 may include one or more backup media on which a copy of data from clients 122, 124, 126, and 128 may be stored. In addition, clients 122, 124, 126, and 128 may be equipped with plural media so that data may be backed up locally and/or on a backup server over network 100. In operation, data protection software located on each of clients 122, 124, 126, and 128 may execute in the background to perform data backups. Backup frequency and storage location may depend on a variety of factors including the urgency of data protection, availability of media storage space, network connection state, and enterprise policies. For example, in one embodiment, a mobile client such as client 128 may take advantage of local backups when it is not connected to enterprise network 100. Subsequently, if mobile client 128 connects to network 100, a backup of data to data server 170 may be performed.

Figure 2:
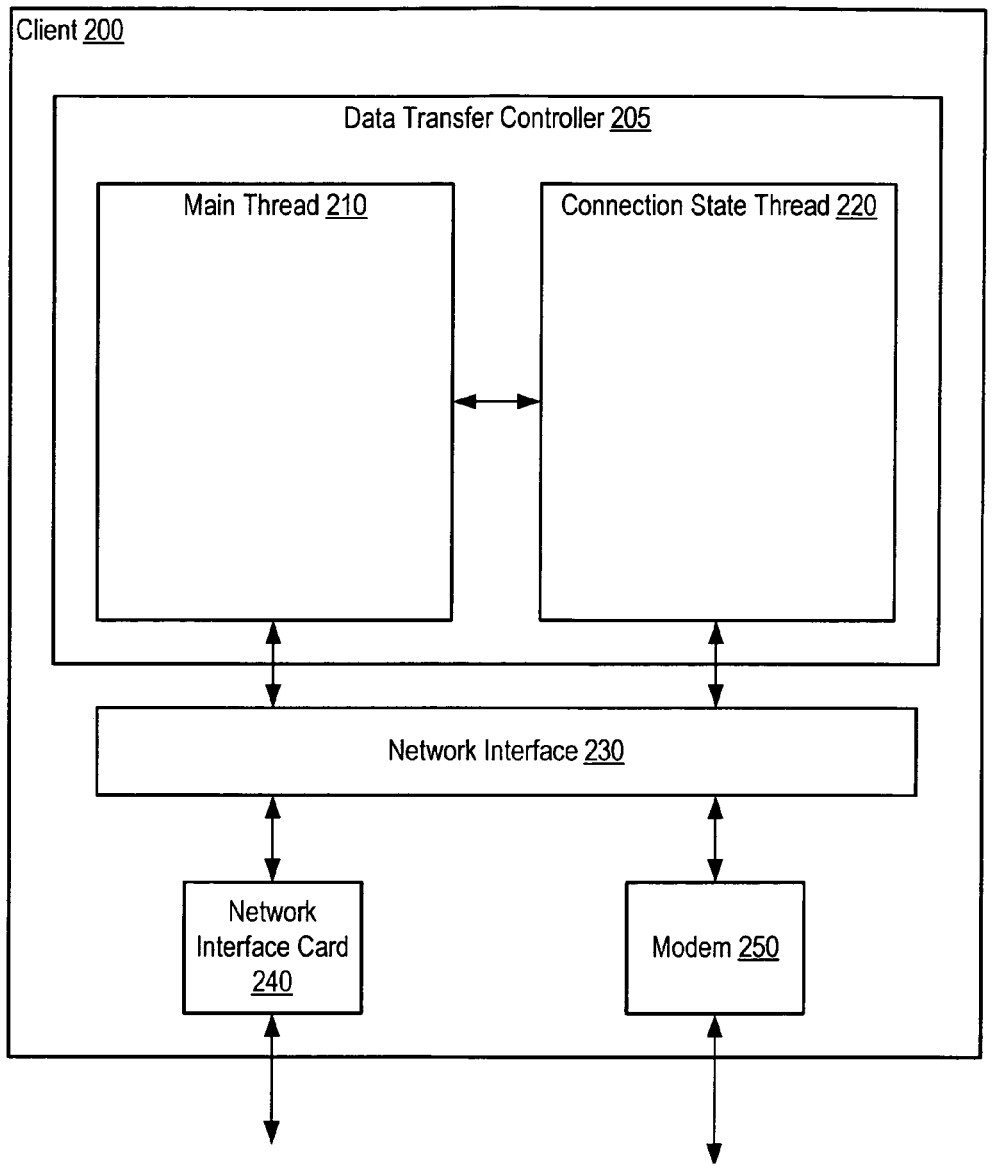
FIG. 2 is a generalized block diagram of one embodiment of the hardware and software components of a client.

FIG. 2 is a generalized block diagram of one embodiment of the hardware and software components of a client 200. Client 200 may be a desktop client or a mobile client. Client 200 may include both software and hardware components. For example, in the illustrated embodiment, the software components of client 200 include a data transfer controller 205 and a network interface 230. In one embodiment, data transfer controller 205 may include a main thread 210 and a connection state thread 220. In an alternative embodiment, data transfer controller 205 may comprise a single thread that executes the functions of main thread 210 and connection state thread 220. In further alternatives, main thread 210 and connection state thread 220 may be implemented as software objects, processes, threads, subroutines or another other type of software component. For convenience, any of these types of components will be referred to as threads in the discussion that follows, although alternative implementations are not so limited. The hardware components of client 200 include a network interface card 240 and a modem 250. In addition, client 200 may include numerous other software and hardware components that would typically be found in a general purpose computer for performing a wide variety of functions.

In operation, client 200 may communicate with an enterprise network through network interface card 240 or modem 250. Main thread 210 may perform data transfers through network interface 230 which may serve as an abstraction layer between main thread 210 and network interface card 240 or modem 250. More specifically, any operation performed by main thread 210 that requires data transfer to or from the enterprise network may communicate through network interface 230, which may be configured to maintain connectivity through any active hardware interface device such as network interface card 240 or modem 250. In addition, connection state thread 220 may communicate with network interface 230 to determine which hardware interface device is active and to determine the characteristics of that device.

Figure 3:
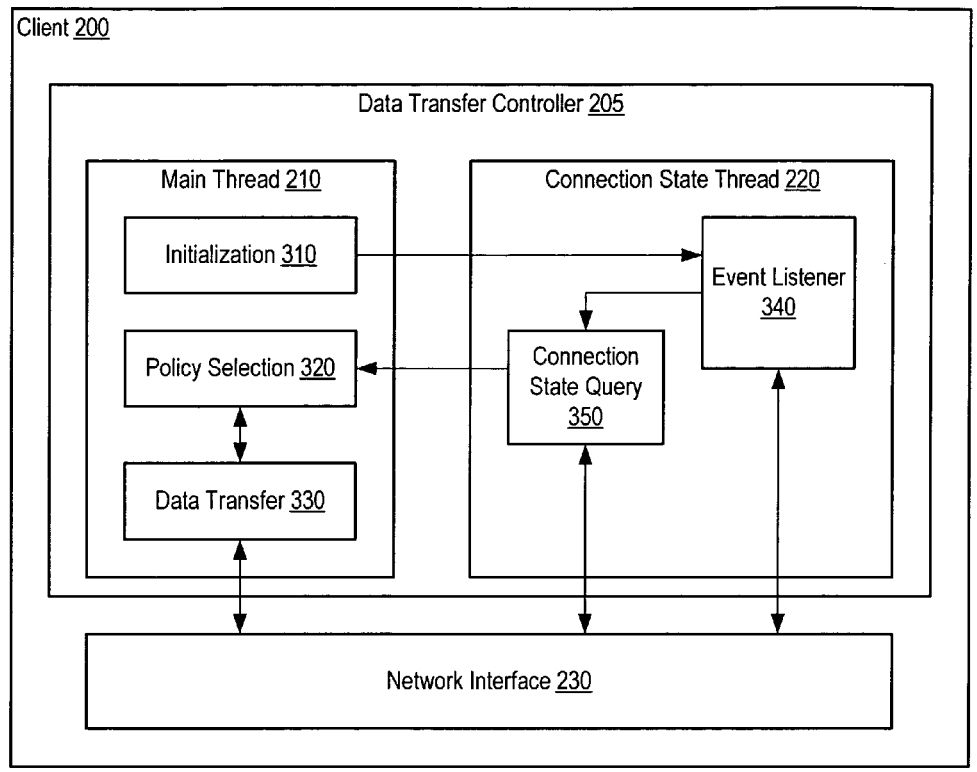
FIG. 3 is a block diagram of one embodiment of the software components of a client.

FIG. 3 is a block diagram of one embodiment of the software components of a client 200. In the illustrated embodiment, as previously noted regarding FIG. 2, client 200 may include data transfer controller 205, main thread 210, connection state thread 220, and network interface 230. Main thread 210 may include code for performing initialization 310, policy selection 320, and data transfer 330. Connection state thread 220 may include an event listener 340 and a connection state query 350.

In operation, main thread 210 may begin by executing initialization 310. Initialization 310 may launch connection state thread 220 including event listener 340, which monitors the state of network interface 230 for change events. When event listener 340 recognizes an event, it may cause connection state query 350 to fetch the current state of network interface 230. Subsequently, connection state query 350 may forward the current connection state to policy selection 320 within main thread 210. Policy selection 320, in response to receiving an update to the connection state, may apply one or more rules to data transfer 330. Examples of the rules which may be applied to data transfers are given below.

Specific details of data transfer controller 205 may depend on the operating system capabilities of client 200. In one embodiment, client 200 may run Microsoft's Windows® operating system which provides a number of standard network API calls that may be used to implement connection state thread 220. For example, event listener 340 may include a call to RasConnectionNotification( ) as well as a call to NotifyAddrChange( ) When either of these methods detects an event, it may trigger connection state query 350 to ask for the current connection state. Windows® provides another API, InternetGetConnectedState( ), through which connection state query 350 may obtain the current connection state. Other methods of determining the network connection state in the Windows® or other operating systems are possible and contemplated. For instance, in one embodiment, Windows Management Instrumentation (WMI) provides a Win32_NetworkAdapterConfiguration class that could be used by event listener 340 to receive notification from a network interface device when the network connection state changes. In an alternative embodiment, data transfer controller 205 may use a polling algorithm to periodically check for connection state changes.

Data transfer, as used herein, may be part of any of a number of functions that make use of the enterprise network to move data between a client and other network-connected devices. For example, data protection functions may comprise transfers of data to a backup medium over the enterprise network. Alternatively, file sharing, software updates, virus definition updates, or any of a variety of other operations may comprise transfers of data either from the client to the enterprise network or from the enterprise network to the client.

A variety of rules may be applied to data transfers depending on the desired functionality, type of connection, connection bandwidth, user priorities, etc. In one embodiment, a user such as a system administrator may configure policies for data transfers such as backups, updates, etc. that are sensitive to the type of connection and various characteristics of the network connection. For example, a user may configure a modem policy. For a modem policy, a system administrator may decide that modem connections have lower bandwidth than non-modem connections. Accordingly, the system administrator may apply a rule that distinguishes between connections that use a modem and connections that do not. For instance a first rule may prohibit data transfers over a modem connection. In the case of data backup, this rule may be further interpreted to prohibit copying files to a remote network share over a modem connection, while allowing local backup copying to continue. If the client connection changes to a non-modem connection, the modem policy rule prohibiting data transfers may no longer apply and remote copying may resume.

A second, alternative rule may dictate that only data transfers of files of less than a selected size may be performed over a modem connection. Conversely, larger size files may be transferred over non-modem connections. Such a rule may be referred to as file size exclude filter. Thirdly, in certain circumstances, a rule may dictate that full data transfer capabilities should apply to both modem and non-modem connections. One such example is the case when a system administrator determines that it is imperative to backup data from all clients as soon as possible, regardless of the effect on connection bandwidth.

In addition or as an alternative, a user may configure an IP address range policy. An IP address range policy may use the same rules that were available to a modem policy except that the rule considers the IP address assigned to the client for a given connection rather than the connection type when implementing the policy. For example, if the assigned IP address indicates that the client is directly connected to an enterprise LAN, then a rule may be associated with such connections allowing full data transfers. Conversely, if the assigned IP address indicates that the client is connected to the enterprise network via a WAN, then a rule may be associated with such connections allowing no data transfers or only data transfers of small files. The user may configure various rules to apply to one or more ranges of IP addresses. IP address ranges may be selected for various reasons such as the type and location of connection equipment (router, switch, hub, etc.), whether the IP address range is inside or outside an enterprise's network security structure, bandwidth availability to the IP address range, etc.

Also, a user may configure an Active Directory policy. An Active Directory policy may use the same rules that were available to a modem policy except that the rule considers one or more attributes of the user with whom the client is associate rather than the connection type when implementing the policy. These attributes may be stored in a predetermined location such as a database, an LDAP-compliant directory such as Active Directory, or other data repository. Some examples of these attributes include the user's name, IP address, operating system version, etc. A user such as a system administrator may match certain attributes to certain rules. For example, a rule may enable virus definition updates to certain users of certain virus-susceptible operating systems, regardless of connection type. Or, backups of small files may be performed for an important user who is connected via a low-bandwidth connection while backups for other users are restricted to connections with higher bandwidth.

A user may configure one or more policies and associate rules with attributes within each policy. In one embodiment, a single policy may be selected and configured. In alternative embodiments, multiple policies may be combined. For instance, an IP address range policy may invoke a modem policy for a given IP address range and apply some other policy rules to IP addresses outside of the given range. In other embodiments, policies may be combined hierarchically. Similarly, within an Active Directory policy, multiple attributes may be combined using Boolean logic, if-then-else logic, etc.

Figure 4:
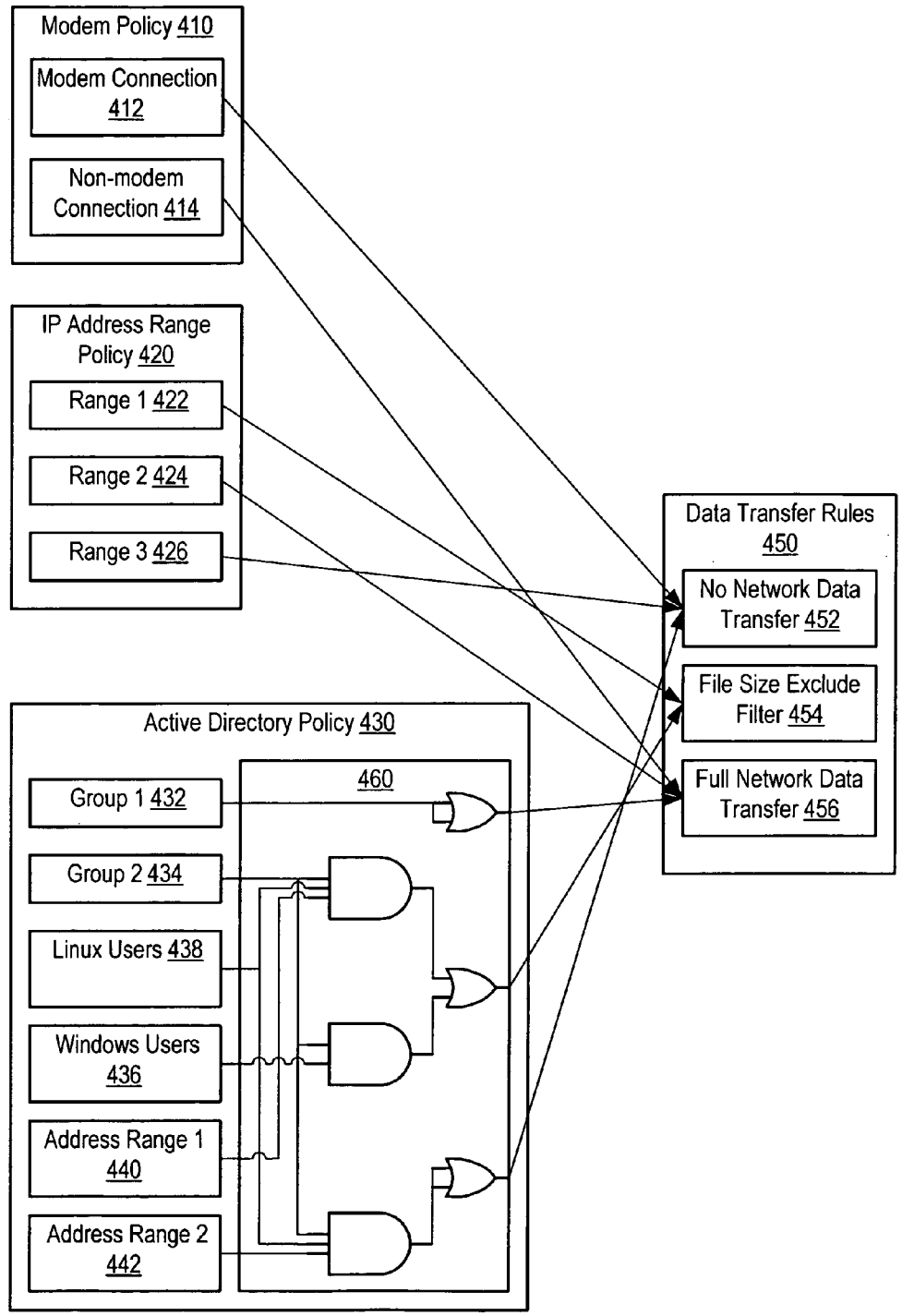
FIG. 4 illustrates one embodiment of a mapping of data transfer policies to data transfer rules.

FIG. 4 illustrates one embodiment of a mapping of data transfer policies to data transfer rules. Three policy types are shown: a modem policy 410, an IP address range policy 420, and an Active Directory policy 430. A set of data transfer rules 450 is also shown. Modem policy 410 assigns each connection to one of two groups, a modem connection group 412 or a non-modem connection group 414. IP address range policy 420 assigns each connection to one of three IP address ranges, range 422, range 424, or range 426. Active Directory policy 430 evaluates one or more attributes of each connection and maps the combination of attributes to a user configurable set of matching criteria.

In operation, the structure of each policy and the mapping of the policy structure to a set of data transfer rules may be configured by a user such as a system administrator. For example, a user may be presented with a graphical user interface through which each policy may be selected and configured in successive operations. In the illustrated embodiment, modem policy 410 has been configured to map modem connection group 412 to rule 452, which specifies that no network data transfers are to be performed. Connection group 414 is mapped to rule 456, which specifies that full network data transfers are enabled.

Also, IP address range policy 420, as shown, is configured to map range 422 to rule 454, which specifies that a file size exclude filter be applied to determine whether to execute a file transfer. A rule incorporating a file size exclude filter, such as rule 454, may permit transfers of files that are smaller than a selected size while excluding transfers of files larger than the selected size. Range 424 is shown mapped to rule 456 (full network data transfers enabled). Range 426 is shown mapped to rule 452 (no network data transfers).

In addition, Active Directory policy 430, in the example shown, maps the values of three attributes to data transfer rules 450 using standard AND-OR logic 460. Logic 460 is representative of a variety of logic implementations that may be configured in software. Active Directory policy 430 may evaluate each client by username or other identifying attribute and assign each client to either group 432 or group 434. In the illustrated embodiment, group 432 is mapped to rule 456. Additional attributes may be evaluated for clients which are assigned to group 434. For instance, as shown, clients which are assigned to group 434 and which are running the Linux operating system and which are assigned an IP address in address range 440 are mapped to rule 454. Clients which are assigned to group 434 and which are running the Windows® operating system are also mapped to rule 454. Clients which are assigned to group 434 and which are running the Linux operating system and which are assigned an IP address in address range 442 are mapped to rule 452. The mappings of logic 460 are but one example of the wide variety of mappings that are possible in various embodiments that may incorporate more or fewer attributes and attribute combinations, depending on the configuration selected by the user.

Figure 5:
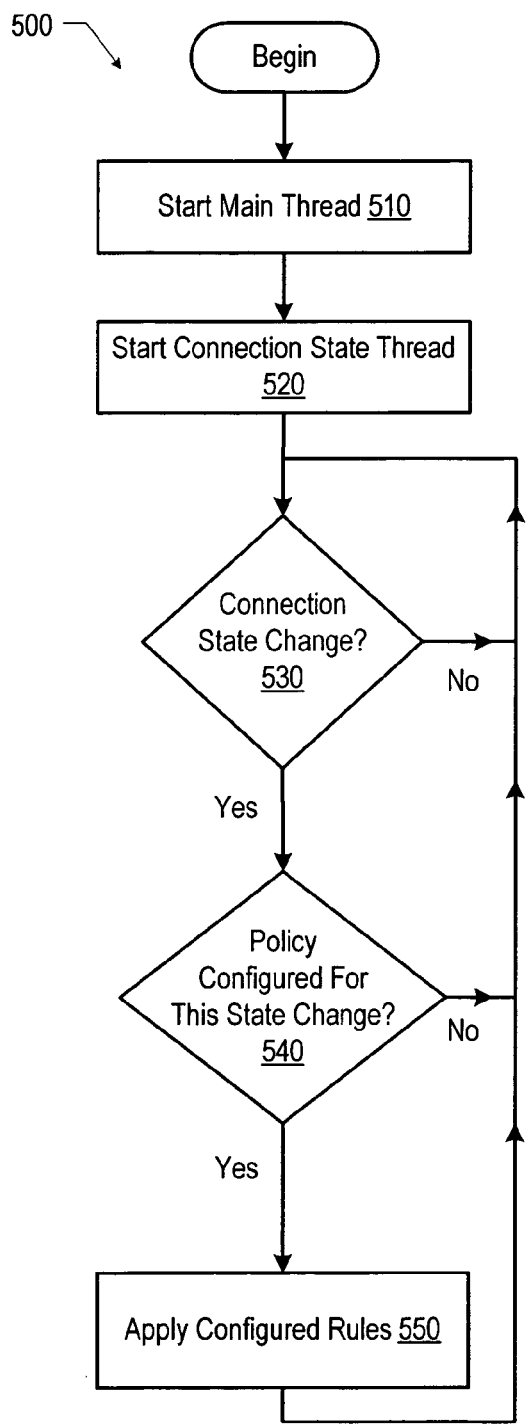
FIG. 5 illustrates one embodiment of a process for dynamically applying data transfer rules and policies.

FIG. 5 illustrates one embodiment of a process 500 for dynamically applying data transfer rules and policies. Process 500 begins with the start of execution of a main thread (block 510). The main thread may start a separate, connection state thread (block 520). After starting the connection state thread, the main thread may wait for the connection state thread to report that the connection state has changed (decision block 530). If the connection state has changed, the main thread may determine if the change of state that was reported affects a configured policy (block 540). If a configured policy is affected by the state change that has been reported, the main thread may apply whatever data transfer rule has been configured for the new connection state (block 550). If no configured policy is affected by the connection state change that has been reported, the main thread may return to decision block 530 to wait for further connection state changes.

Figure 6:
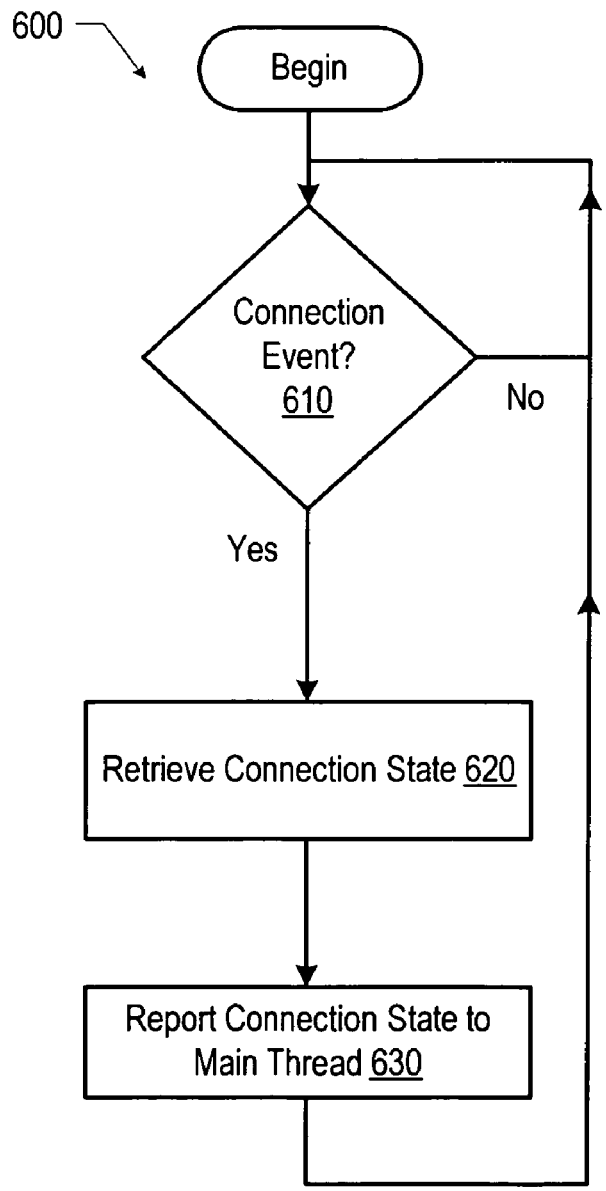
FIG. 6 illustrates one embodiment of a process that may be used by a connection state thread for monitoring and reporting changes to the connection state of a client operating in an enterprise network.

FIG. 6 illustrates one embodiment of a process 600 that may be used by a connection state thread for monitoring and reporting changes to the connection state of a client operating in an enterprise network. A connection state thread may begin process 600 by waiting in a loop to detect one or more events related to the connection state (decision block 610). If an event is detected, the connection state thread may convey a request to retrieve the connection state (block 620). Once the connection state has been retrieved, it may be reported to a main thread (block 630) which may take appropriate action according to the new connection state. After reporting the connection state to the main thread, the connection state thread may return to decision block 610 to wait for further connection state changes.

It is noted that the above described embodiments may comprise software. In such an embodiment, the program instructions which implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
   a backup server;
   a network; and
   a client device coupled to the backup server via the network, the client device comprises:
      at least two different communication components, each corresponding to one of a modem, a wireless network, and a wired network;
      at least two data backup rules, each of said data backup rules corresponding to a different backup procedure to back up data from the client to a remote backup server, the first backup rule backs up files of the data from the client not included by the second backup rule;
   a data transfer controller to associate a first backup rule with a first connection state, and a second backup rule with a second connection state, the data transfer controller comprising a main thread and a connection state thread, the first backup rule consumes more bandwidth than the second backup rule; and a policy component;
   in response to the client detecting the client has established a connection to the network, the data transfer controller is configured to:
      determine a state of the connection;
      forward said state to the policy component;
      apply the first data backup rule to the client device, in response to detecting said connection state corresponds to a first connection type transmitting data at a first speed;
      apply the second data backup rule to the client device, in response to detecting
   said connection state corresponds to a second connection type transmitting data at a second speed which is lower than the first speed;
      initiate a backup procedure based upon an applied backup rule of the first backup rule or the second backup rule, so that data is conveyed from the client to the backup server for backup; and
   the data transfer controller applies one or more exceptions to the second data backup rule in response to determining said connection corresponds to a particular user, said one or more exceptions comprise backing up files which would not be backed up according to the second data backup rule.

2. The computer system of claim 1, wherein the data transfer controller is further configured to:
   associate a data backup policy with one or more attributes of a connection between the client device and the computer network, wherein a connection state comprises a set of values of the one or more attributes;
   detect a first connection state of a client device;
   apply a first data backup rule that is associated with the first connection state to the client device;
   detect a change in the connection state of the client device to a second connection state; and
   apply a second data backup rule that is associated with the second connection state to the client device.

3. The computer system of claim 1, wherein a data transfer controller on each of a plurality of client devices is further configured to:
   associate a data backup policy with one or more attributes of a connection between the client device and the computer network, wherein a connection state comprises a set of values of the one or more attributes;
   wherein a data transfer controller of a first client device is further configured to:
      detect a first connection state of the first client device;
      apply a first data backup rule that is associated with the first connection state to the first client device; and
   wherein a data transfer controller of a second client device is further configured to:
      detect a second connection state of the second client device;
      apply a second data backup rule that is associated with the second connection state to the second client device.

4. The computer system of claim 1, wherein each of said first connection type and second connection type comprise a modem connection, a wireless LAN connection, a WAN connection, or a cabled LAN connection.

5. The computer system of claim 1, the data transfer controller is configured to select either the first data backup rule or the second data backup rule for use based at least in part on whether or not the client connection corresponds to given IP address range.

6. The computer system of claim 1, the data transfer controller is configured to select either the first data backup rule or the second data backup rule for use based at least in part on whether or not the client connection corresponds to a given user name or a given client operating system.

7. A method of managing data backups between client devices and a computer network, the method comprising:
 the client associating a first backup rule with a first connection state, and a second backup rule with a second connection state, the first backup rule consumes more bandwidth than the second backup rule, each of said data backup rules corresponding to a different backup procedure to back up data from a client device to a remote backup server, the first backup rule backs up files of the data from the client not included by the second backup rule;
 in response to the client detecting the client has established a connection to the network, a data transfer controller of the client device:
  determining a state of the connection;
  forwarding said state to a policy component within the client;
  applying the first data backup rule to the client device, in response to detecting said connection state corresponds to a first connection type transmitting data at a first speed;
  applying the second data backup rule to the client device, in response to detecting said connection state corresponds to a second connection type transmitting data at a second speed which is lower than the first connection speed; and
  initiating a backup procedure based upon an applied backup rule, so that data is conveyed from the client to the backup server for backup; and
  applying one or more exceptions to the second data backup rule in response to determining said connection corresponds to a particular user, said one or more exceptions comprise backing up files which would not be backed up according to the second data backup rule, the data transfer controller comprising a main thread and a connection state thread, the client comprising a modem and a network interface card.

8. The method of claim 7, further comprising:
 associating a data backup policy with one or more attributes of a connection between the client device and the computer network, wherein a connection state comprises a set of values of the one or more attributes;
 detecting a first connection state of a client device;
 applying a first data backup rule that is associated with the first connection state to the client device;
 detecting a change in the connection state of the client device to a second connection state; and
 applying a second data backup rule that is associated with the second connection state to the client device.

9. The method of claim 7, further comprising:
 on each of the plurality of client devices, associating a data backup policy with one or more attributes of a connection between the client device and the computer network, wherein a connection state comprises a set of values of the one or more attributes;
 detecting a first connection state on a first client device;
 applying a first data backup rule that is associated with the first connection state to the first client device;
 detecting a second connection state on a second client device;
 applying a second data backup rule that is associated with the second connection state to the second client device.

10. The method of claim 7, wherein the client is further configured to:
 initiate a backup procedure to backup files of the client onto the client when not connected to said network; and
 permit a user of the client to restore files previously backed up onto the client.

11. The method of claim 7, further comprising selecting either the first data backup rule or the second data backup rule for use based at least in part on whether or not the client connection corresponds to a given IP address range.

12. The method of claim 7, further comprising selecting either the first data backup rule or the second data backup rule for use based at least in part on whether or not the client connection corresponds to given user name, and a given client operating system.

13. The method of claim 7, wherein the first data backup rule prohibits data backup of files greater than a first size and the second data transfer rule prohibits data backup of files whose size is greater than a second size.

14. A non-transitory computer readable medium storing computer instructions for managing data backups between client devices and a computer network, the instructions are executable by a processor to:
 cause a client to associate a first backup rule with a first connection state, and a second backup rule with a second connection state, the first backup rule consumes more bandwidth than the second backup rule, each of said data backup rules corresponding to a different backup procedure to back up data from a client device to a remote backup server, the first backup rule backs up files of the data from the client not included by the second backup rule;
 in response to the client detecting the client has established a connection to the network, the program instructions are further executable to cause a data transfer controller of the client device to: determine a state of the connection; forward said state to a policy component within the client; apply the first data backup rule to the client device, in response to detecting said connection state corresponds to a first connection type transmitting data at a first speed;
 the second data backup rule to the client device, in response to detecting said connection state corresponds to a second connection type transmitting data at a second speed which is lower than the first speed; and
 initiate a backup procedure based upon an applied backup rule of the first backup rule or the second backup rule, so that data is conveyed from the client to the backup server for backup; and
 applying one or more exceptions to the second data backup rule in response to determining said connection corresponds to a particular user, said one or more exceptions comprise backing up files which would not be backed up according to the second data backup rule, the data transfer controller comprising a main thread and a connection state thread, the client comprising a modem and a network interface card.

15. The non-transitory computer readable medium of claim 14, wherein the instructions are further executable by a processor to:
  associate a data backup policy with one or more attributes of a connection between the client device and the computer network, wherein a connection state comprises a set of values of the one or more attributes;
  detect a first connection state of a client device;
  apply a first data backup rule that is associated with the first connection state to the client device;
  detect a change in the connection state of the client device to a second connection state; and
  apply a second data backup rule that is associated with the second connection state to the client device.

16. The non-transitory computer readable medium of claim 14, wherein the instructions are further executable by a processor to:
  on each of the plurality of client devices, associate a data backup policy with one or more attributes of a connection between the client device and the computer network, wherein a connection state comprises a set of values of the one or more attributes;
  detect a first connection state on a first client device;
  apply a first data backup rule that is associated with the first connection state to the first client device;
  detect a second connection state on a second client device;
  apply a second data backup rule that is associated with the second connection state to the second client device.

17. The non-transitory computer readable medium of claim 14, wherein one of the attributes is a connection type comprising a modem connection, a wireless LAN connection, a WAN connection, or a cabled LAN connection.

18. The non-transitory computer readable medium of claim 14, wherein the instructions are further executable by a processor to select either the first data backup rule or the second data backup rule for use based at least in part on whether or not the client connection corresponds to a given IP address range.

19. The non-transitory computer readable medium of claim 14, wherein the instructions are further executable by a processor to select either the first data backup rule or the second data backup rule based at least in part on whether or not the client connection corresponds to the attributes include at least one of given a user name, and a given client operating system.

* * * * *